C. C. FARMER.
SELF LUBRICATING ANGLE COCK.
APPLICATION FILED DEC. 10, 1919.

1,403,756.

Patented Jan. 17, 1922.

INVENTOR
CLYDE C. FARMER
BY Wm. M. Cady
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SELF-LUBRICATING ANGLE COCK.

1,403,756.    Specification of Letters Patent.    Patented Jan. 17, 1922.

Application filed December 10, 1919. Serial No. 343,949.

*To all whom it may concern:*

Be it known that I, CLYDE C. FARMER, a citizen of the United States, residing at Edgewood, in the county of Allegheny and State of Pennsylvania, have invented new and useful Improvements in Self-Lubricating Angle Cocks, of which the following is a specification.

This invention relates to means for lubricating valves, more particularly of the type employed as angle and stop cocks in fluid pressure train pipes.

The principal object of my invention is to provide improved means for automatically lubricating valves of the above character.

Figure 1:
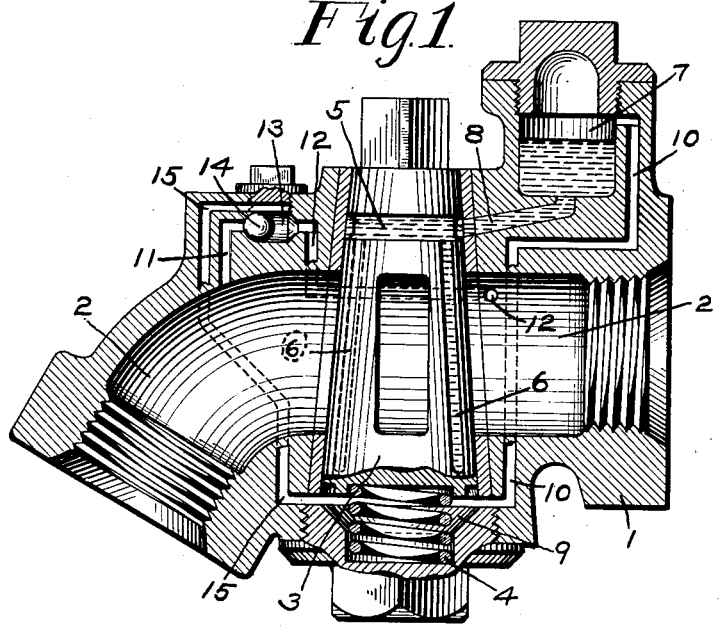
Figure 2:
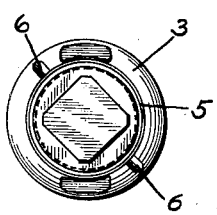

In the accompanying drawing; Fig. 1 is a sectional view of an angle cock device, showing my improvement applied thereto; and Fig. 2 a plan view of the plug valve.

As shown in the drawing, the angle cock device may comprise a body casting 1, having a fluid pressure conduit 2, communication through which is controlled by a tapered plug valve 3, having a spring 4, tending to maintain said valve seated.

According to my invention, in order to lubricate the valve, the plug cock 3 is provided with an annular groove or recess 5 at the upper portion, into which lead vertical grooves 6, extending nearly to the lower end of the cock.

An oil reservoir or chamber 7, containing a quantity of oil, is connected by passage 8 to the recess 5 and the chamber 9 below the cock 3 is connected by a passage 10 with the space in the oil chamber 7 above the oil therein.

A passage 11 leads from the conduit 2 at one side of the plug valve 3 and a passage 12 leads from the conduit 2 at the other side of said valve, to a chamber 13, containing a check valve 14 adapted to seat in opposite directions, for controlling communication from said conduit to a passage 15, which leads to the chamber 9.

In operation, if the cock 3 is in its closed position, and fluid under pressure is supplied to conduit 2 at one side or the other of the cock 3, the pressure of fluid in the conduit at the side having the higher pressure will force the check valve 14 to the opposite seat, thus permitting fluid at the higher pressure to flow through passage 15 to chamber 9 and thence through passage 10 to oil chamber 7.

This ensures not only that the fluid pressure on the oil will at least be balanced so that oil will flow by gravity from chamber 7 into the recess 5, but in addition there will be times when the pressure acting on the oil in the reservoir will be higher, so that oil will be forced into the cock by fluid pressure as well as by gravity. This is the case particularly where the fluid pressure in the conduit 2 leaks away or is released therefrom.

Oil in the recess 5 then flows into the grooves 6 and lubricates the bearing surfaces of the cock and its seat as the cock is turned back and forth in operation.

The grooves 6 are cut in the plug valve 3 at diametrically opposite points, and are so positioned that they will not open into the conduit 2 when the valve is turned back and forth between the open and closed positions. Thus loss of oil by flow from the grooves 6 into the conduit 2 is prevented.

Having now described my invention, what I claim as new, and desire to secure by Letters Patent, is:—

1. The combination with a valve body having a fluid pressure conduit and a plug valve in said body for controlling communication through said conduit, of an oil reservoir having a passage through which oil is supplied to said valve and means for supplying fluid under pressure from said conduit to the oil reservoir independently of the plug valve.

2. The combination with a valve body having a fluid pressure conduit and a plug valve in said body for controlling communication through said conduit, of an oil reservoir having a passage through which oil is supplied to said valve and a double seating check valve for controlling communication from passages leading from said conduit at opposite sides of the plug valve to a passage leading to said oil reservoir.

3. The combination with a valve body having a fluid pressure conduit and a plug valve in said body for controlling communication through said conduit, of an oil reservoir having a passage through which oil is supplied to said valve and a double seating check valve for controlling communication from passages leading from said conduit at opposite sides of the plug valve to a passage leading through the chamber below the plug valve to the oil reservoir.

In testimony whereof I have hereunto set my hand.

CLYDE C. FARMER.